United States Patent [19]

Kanno et al.

[11] Patent Number: 5,166,035
[45] Date of Patent: Nov. 24, 1992

[54] OPTICAL INFORMATION MEMORY MEDIUM

[75] Inventors: Toshiyuki Kanno, Tokyo; Hitoshi Watanabe; Shimako Nozaki, both of Hachioji, all of Japan

[73] Assignee: Olympus Optical Co., Ltd., Tokyo, Japan

[21] Appl. No.: 376,819

[22] Filed: Jul. 7, 1989

Related U.S. Application Data

[63] Continuation-in-part of Ser. No. 138,587, Dec. 28, 1987, abandoned.

[30] Foreign Application Priority Data

Jan. 5, 1987 [JP] Japan .......................................... 62-11
Feb. 20, 1987 [JP] Japan .................................. 62-36929

[51] Int. Cl.$^5$ .............................................. G03C 1/495
[52] U.S. Cl. .................................... 430/271; 430/281; 430/495; 430/530; 430/942; 430/945
[58] Field of Search ............... 430/271, 495, 945, 942, 430/530, 281

[56] References Cited

U.S. PATENT DOCUMENTS 4,737,444  4/1988  Satoh et al. ........................... 430/271

Primary Examiner—Charles L. Bowers, Jr.
Assistant Examiner—Thorl Chea
Attorney, Agent, or Firm—Frishauf, Holtz, Goodman & Woodward

[57] ABSTRACT

An optical information memory medium comprising a substrate, an improved underlying layer formed on the substrate surface, and a recording layer formed on the underlying layer and mainly consisting of an organic pigment is disclosed. In this optical information memory medium, the underlying layer is formed by causing a compound containing a hydroxyl or carboxyl group selected from the group consisting of a radical polymerizable monomer containing a hydroxyl or carboxyl group, a copolymer obtained from a monomer containing a hydroxyl or carboxyl group, and a polymer compound containing a hydroxyl or carboxyl group to react with a hydrolyzed condensate which is derived from an alkoxide or an aryloxide of a metal selected from the group consisting of Al, Ti, Zr, In, Zn, Mg, Ni, and Cu or from a chelate compound mainly consisting of the metal. An underlying layer formed of a hydrolyzed condensate which is derived from the alkoxide or the aryloxide of a metal selected from the group consisting of Al, Ti, Zr, In, Zn, Mg, Ni, and Cu is also disclosed.

16 Claims, No Drawings

OPTICAL INFORMATION MEMORY MEDIUM

This application is a Continuation-in-Part of application Ser. No. 07/138,587, filed Dec. 28, 1987 now abandoned in favor of a continuation application, Ser. No. 07/403,039, filed Aug. 31, 1989.

BACKGROUND OF THE INVENTION

1. Field of the Invention

The present invention relates to an optical information memory medium and, more particularly, to an optical information memory medium using an organic pigment as a recording layer.

2. Description of the Prior Art

An example of the optical information memory medium is an optical disk. An optical disk consists of a disk-shaped substrate and a thin-film recording layer formed thereon. The recording layer stores information by forming an optically detectable small (about 1 μm) pit. A plurality of pits are formed in the form of a helical or concentric track to record information at high density.

In order to write information in an optical disk, a laser beam is radiated so as to be focused on the surface of the recording layer having sensitivity with respect to the laser. Radiated laser energy is absorbed in the recording layer, and an optically detectable pit is formed. For example, in a heat mode recording method, a radiated portion of the recording layer absorbs the laser energy and hence is locally heated. This portion is melted and evaporated or agglomerates, i.e., physically changes. As a result, a difference is produced in an optically detectable property such as and a non-radiated portion. Therefore, information is written in a state to allow subsequent reading. Note that in order to form a plurality of pits in the form of a helical or concentric track, the laser beam is scanned on the surface.

Examples of a thin film of an inorganic material conventionally used as a recording layer of an optical information memory medium are a thin metal film such as an aluminum deposited film, a thin bismuth film, a thin tellurium film, an amorphous film consisting of chalcogenide, and the like. However, since these films have high reflectance and low energy absorbance, a high-output laser is required as a writing light source. In addition, these films have high thermal conductivity and high melting point and hence have low sensitivity. Moreover, elements such as tellurium, bismuth, and serenium are toxic to a human body.

For this reason, instead of thin films of the above inorganic materials, an optical information memory medium using a thin organic pigment film as a recording layer has recently been studied. An optical information memory medium of this type will be briefly described below.

That is, a recording layer consisting of a thin organic pigment film has the following advantages.

An absorption wavelength can be selected and it is possible to obtain a characteristic absorption wavelength within the near infrared region wherein information can be written by a semiconductor laser.

An energy absorbance is high in a write operation.
Thermal conductivity is low.
Productivity is good and toxicity is low.

Typical organic pigments used as the recording layer are exemplified below.

A series of cyanine pigments (Japanese Patent Disclosure (Kokai) No. 58-112790),
A series of anthraquinone pigments (Japanese Patent Disclosure (Kokai) No. 52-224448).
A series of naphthoquinone pigments (Japanese Patent Disclosure (Kokai) No. 58-224793).
A series of phthalocyanine pigments (Japanese Patent Disclosure (Kokai) No. 60-48396).

In order to form a recording layer using the above organic pigments, the pigments are independently used or used as a composition mixed with a auto-oxidizable resin as a binder and coated on the surface of a substrate by application or the like. Examples of a film formation method are a spinner application, dipping, plasma deposition, and vacuum evaporation.

In a spinner application, a pigment is dissolved in a suitable organic solvent to obtain an application solution, and the resultant application solution is dripped on a rotating substrate surface to form a thin film. According to this method, a uniform film can be most easily formed with good productivity. An optical information memory medium using the thin organic pigment film as a recording layer is greatly advantageous because the recording layer can be formed by a spinner application as described above.

Examples of the substrate are a glass substrate and a synthetic resin substrate which are optically transparent with respect to a recording wavelength and do not adversely affect writing/reading. A guide track is formed on the surface of the substrate. The guide track consists of a guide groove (having a width of about 1 μm and a depth of about 0.1 μm) with an optical step and provides a means for tracking write and read positions with high reliability upon scanning.

A guide track can be easily formed by injection molding on a thermoplastic resin substrate. On the contrary, in order to form a guide track on a glass substrate, a difficult molding method such as casting or decalcomania (2P method) using a photocurable resin must be performed, resulting in low productivity. For this reason, injection molded substrates using an acrylic resin, a polycarbonate resin, a polyolefin resin, and the like each of which has good productivity and optical characteristics and is suitable for mass production are most widely used.

However, the optical information memory medium using the organic pigment as the recording layer has the following problems due to an organic solvent contained in an organic pigment solution applied to form the recording layer by spinner application.

That is, as described above, a thermoplastic resin substrate is most widely used as the substrate, and this substrate can be easily dissolved or attacked in an organic solvent except for some alcohol solvents. For this reason, the smoothness of the substrate surface is degraded during a spinner application, or the guide track step is dissolved and vanished. In addition, since the pigment is partially mixed with a substrate resin component, the reflectance of pigment film/substrate interface required for information reading is reduced. As a result, tracking cannot be performed, or the information reading property is degraded.

A glass substrate has high resistance to solvents and hence does not pose the above problems. However, the glass substrate has low productivity, i.e., one of the advantages of the organic pigment memory medium is lost as described above.

In order to solve the above problem, conventionally, an underlying layer with resistance to solvents is provided on the substrate surface, and a pigment solution is applied on the underlying layer to form a recording layer. This underlying layer must have resistance to solvents and must be a very thin film with a thickness of about 10 to 30 nm (0.01 to 0.03 μm) so as not to bury the guide groove with a depth of about 0.1 μm. As such an underlying layer, a film obtained by applying a resin solution of a type which is cured by radiation of light such as ultraviolet rays and curing the solution or an inorganic deposited film such as an $SiO_2$ film is conventionally used. However, these conventional underlying layers have the following problems.

That is, most of the resins of a type cured by radiation of light are cured by radical polymerization. If the film is very thin, the generation efficiency of radicals by radiation of light is low, and the generated radicals tend to be scavenged by oxygen in the air. For this reason, if a radiating time is not enough, the resin is cured incompletely. On the contrary, if the radiating time is too long, the substrate generates heat to cause thermal deformation.

In addition, since the inorganic deposited film such as the $SiO_2$ film is formed by deposition or sputtering, a batch method must be used in manufacturing steps, resulting in low productivity. Furthermore, a continuous film with a high density which can completely prevent permeation of solvent molecules cannot be easily obtained.

SUMMARY OF THE INVENTION

It is, therefore, an object of the present invention to provide an optical information memory medium obtained by forming an underlying layer with resistance to solvents on a substrate and forming a recording layer mainly consisting of an organic pigment on the underlying layer, in which the underlying layer is formed thinner and has a higher resistance to solvents, thereby improving the reading characteristics and the productivity of the underlying layer.

The above object is achieved by an optical information memory medium (to be referred to as a first invention hereinafter) comprising:

a substrate;

an underlying layer formed on the substrate and containing a hydrolyzed condensate of a compound represented by formula I or II,

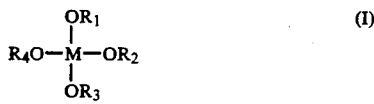

wherein M represents Al, Si, Ti, Zr, or In and $R_1$ to $R_4$ represent an alkyl or aryl group having 2 to 18 carbon atoms, and

wherein M represents Al, Si, Ti, Zr, or In and $R_5$ to $R_7$ represent an alkyl or aryl group having 2 to 18 carbon atoms; and a recording layer formed on the underlying layer and mainly consisting of an organic pigment.

In addition, the above object is achieved more preferably by an optical information memory medium (to be referred to as a second invention hereinafter) comprising:

a substrate;

an underlying layer formed on the substrate, the underlying layer being formed by causing a compound containing a hydroxyl or carboxyl group selected from the group consisting of a radical polymerizable monomer containing a hydroxyl or carboxyl group, a copolymer obtained from a monomer containing a hydroxyl or carboxyl group, and a polymer compound containing a hydroxyl or carboxyl group to react with a hydrolyzed condensate which is derived from an alkoxide or aryloxide of a metal selected from the group consisting of Al, Ti, Zr, In, Zn, Mg, Ni, and Cu or from a chelate compound of the metal; and a recording layer formed on the underlying layer and mainly consisting of an organic pigment.

DETAILED DESCRIPTION OF THE PREFERRED EMBODIMENTS

First, a variety of chemical substances used in the present invention, formation methods of a recording layer and an underlying layer will be described below.

Hydrolyzed Condensate

Al, Ti, Zr, In, Zn, Mg, Ni, and Cu can be easily reacted with alcohol or aryl hydroxide by a known method to form an alkoxide or aryloxide, and react with various chelating agents to form chelate compound. In the first embodiment, only an alkoxide or aryloxide is used. Note that alcohol residue (alkoxyl group) in the alkoxide may be the same or different and, similarly, aryloxy groups of the aryloxide may be the same or different.

Alkoxides and aryloxides are represented by above formulas I and II. As described above, an alcohol for forming an alkoxide preferably has 2 to 18 carbon atoms. N-, iso-, or tert-alkoxide or polymers thereof may be exemplified as preferable alkoxides. Phenoxide may be exemplified as a preferable aryloxide.

Preferable examples of a chelate compound are di-iso-propoxy bis(acetylacetonato) titanium, di-iso-propoxy bis(acetylacetonato) silicon, di-iso-propoxy bis(acetylacetonato) zirconium, di-n-buthoxy bis(ethyl acetoacetato) titanium, di-n-buthoxy bis(ethyl acetoacetato) silicon, di-n-buthoxy bis(ethyl acetoacetato) zirconium, di-iso-propoxy(ethyl acetoacetato) aluminium, di-iso-propoxy(ethyl acetoacetato) indium, tris(ethylacetato) aluminium, tris-(ethylacetato) indium, tris(acetylacetonato) aluminium, tris(acetylacetonato) indium, mono-acetylacetonato bis(ethyl acetoacetato) aluminium, and mono-acetylacetonato bis(ethyl acetoacetato) aluminium.

All the above compounds are well dissolved in alcohol solvents which substantially do not attack a resin substrate. In addition, the above compounds easily react with water in the air to undergo self-condensation accompanied with alcohol elimination by hydrolysis, thereby forming a solid resin insoluble in organic solvents. If polymers having active hydrogen, especially a hydroxyl group or a carboxyl group are present, the above compounds react with the active hydrogen and undergo a similar condensation accompanied with alcohol elimination. In this case, crosslinking is caused between polymer compounds.

Of the above compounds, alkoxides are strongly reactive. The reactivity is lowered as the number of carbon atoms in an alcohol residue increases and changes in an order of tert->sec->n-. Generally, an aryloxide such as phenoxide has lower reactivity than that of an alkoxide. Reactivity of both alkoxides and aryloxides can be controlled by forming chelate compounds using a ketone or ketoester such as ethyl acetoacetate, acethylacetone, and diethyl malonate as a chelating agent.

Compound Containing Hydroxyl Group or Carboxyl Group

A compound used in the second embodiment contains a hydroxyl or carboxyl group and hence is highly hydrophilic and dissolved well in water or alcohol solvents. In addition, since the compound has active hydrogen, when the compound is mixed with the alkoxide, the aryloxide, or the chelate compound, it is subjected to a crosslinking reaction with alcohol elimination and cured as described above.

A first category of the compound is a radical-polymerizable monomer containing a hydroxyl or carboxyl group. Examples of this category are vinyl alcohol; acrylic acid; methacrylic acid; an acrylate or methacrylate such as hydroxyethyl acrylate, hydroxyethyl methacrylate, polyethylene glycol acrylate, or polyethylene glycol methacrylate; fumaric acid; and maleic acid.

A second category is a copolymer between a monomer containing a hydroxy or carboxyl group and a monomer not containing hydroxyl and carboxyl groups. In this case, a content of the monomer component containing a hydroxyl or carboxyl group is 5 to 50 wt % and, more preferably, 10 to 40 wt %. The monomer containing a hydroxyl or carboxyl group includes epoxy-modified acylate, urethan-modified acrylate etc. other than those included in the first category.

A third category is a polymer compound, originally containing a hydroxyl or carboxyl group, such as a cellulose derivative. Examples of the third category are cellulose derivatives such as nitrocellulose, ethyl cellulose, acetylcellulose, and hydroxyethyl cellulose; polyvinyl alcohols such as polyvinyl butyral and polyvinyl formal; polyacetal; polyvinyl acetate; and a partial hydrolysate of an ethylene-vinylacetate copolymer. When the above materials are used, preferable content of hydroxyl group and carboxyl group is 5 to 60 wt %.

Organic Pigment

Examples of an organic pigment which is a main component of the recording layer are a series of cyanine pigments, a series of merocyanine pigments, a series of anthraquinone pigments, a series of triphenylmethane pigments, a series of xanthene pigments, a series of naphthoquinone pigments, a series of phthalocyanine pigments, and a series of octophthalocyanine pigments. Any of the above organic pigments can be used as long as a suitable solvent is present to allow preparation of a solution. In addition, a plurality of pigments may be used at the same time. Of the above pigments, a series of cyanine pigments and a series of anthraquinone pigments have good reflectance and absorbance.

Recording Layer Formation Method

In order to form a recording layer mainly consisting of the organic pigment, the organic pigment and, if necessary, another component such as a binder are dissolved in a suitable organic solvent to prepare an application solution or dispersion having a predetermined concentration.

Examples of the solvent are an ester solvent such as ethyl acetate and butyl acetate, an aromatic solvent such as toluene and xylene, a ketone solvent such as acetone, methyl ethyl ketone, diethyl ketone, and methyl isobutyl ketone, a halogenated hydrocarbon solvent such as dichloromethane, dichloroethane, and chloroform, an ether solvent such as tetrahydrofuran, an alcohol solvent such as methyl alcohol, ethyl alcohol, and isopropyl alcohol, and a cellosolve solvent such as methyl cellosolve and ethyl cellosolve. These solvents can be independently used or mixed with each other.

The above solution or dispersion is prepared and then applied on a suitable substrate on which an underlying layer is formed in accordance with the present invention, thereby forming a thin film, i.e., a recording layer. The smaller a film thickness of the recording layer is, the higher its sensitivity becomes, and its reflectance also depends on the film thickness. For this reason, the film thickness of the recording layer preferably falls within the range of 10 to 1,000 nm and, more preferably, falls within the range of 30 to 500 nm.

Substrate

Conventional substrates can be used. Examples are a plate or a film consisting of a synthetic resin such as a polyacrylate resin, a polycarbonate resin, a polyolefin resin, a phenol resin, an epoxy resin, a polyamide resin, and a polyimide resin; a glass plate; and a metal plate. Note that according to the present invention, since the solvent-resistive underlying layer is formed under the recording layer, a plastic substrate with low resistance to solvents can be suitably used.

Prior to formation of the underlying layer, the substrate surface is preferably subjected to an ozone treatment, plasma treatment, or electron radiation treatment to introduce an active group such as —OH or —COOH onto the surface. As a result, the substrate is brought into tight contact with the underlying layer, and a stronger film can be formed.

Underlying Layer Formation Method

In order to form the underlying layer of the optical information memory medium according to the present invention, a solution having a predetermined concentration and containing a component required for forming the underlying layer is prepared and applied on the surface of the substrate and dried. Preferable examples of a solvent for preparing the solution are an alcohol solvent such as methyl alcohol, ethyl alcohol, n- or isopropyl alcohol, and n- or isobutyl alcohol; water; and a mixture solvent of water and an alcohol. A spinner application is most preferably used as an application method to obtain a thin uniform film.

Note that in order to remove pin holes and prevent charging to form a complete film, a leveling agent, a surfactant, an antistatic agent, and the like may be mixed in small amounts.

The first and second embodiments will be described in detail below.

First Embodiment

In the first embodiment, an underlying layer is formed of only the metal alkoxide represented by formula I or the metal aryloxide represented by formula II.

As described above, these compounds are well dissolved in water or alcohol solvents which do not attack a resin substrate. Therefore, these compounds can be applied as a low-viscosity alcohol solution on a substrate to form a very thin film with good workability without degrading the substrate at all. Either an alkoxide or aryloxide forms a film which has a practically sufficient solvent resistance by the reaction described above. Therefore, unlike an underlying layer formed by radical polymerization, an underlying layer of a very thin film having a sufficient resistance to solvents can be formed without any difficulty of controlling the reaction.

Examples of a compound which has a high hydrolysis speed, high solubility in an alcohol solvent which substantially does not attack the substrate, and low viscosity and hence can easily form a very thin film are $Ti(O-C_4H_9)_4$, $Ti(O-isoC_3H_7)_4$, $Si(O-C_2H_5)_4$, $Si(O-isoC_3H_7)_4$, $Al(O-isoC_3H_7)_3$, $Al(O-C_2H_5)_3$, $Zr(O-C_4H_9)_4$, and $Zr(O-isoC_3H_7)_4$. On the contrary, since a long chain alkoxide such as stearyl alkoxide and phenoxide have high stability and a low hydrolysis speed, drying and curing treatments must be performed for a long period of time. However, a sufficient solvent-resistive film can be obtained with these compounds by selecting suitable conditions.

Although hydrolysis of an alkoxide and aryloxide can be performed at room temperature, a heat treatment may be performed as needed to increase a reaction speed. Note that the heat treatment must be performed at a temperature which will not thermally deform the substrate. For example, an acryl substrate must be heated below about 60° C., and a polycarbonate substrate must be heated below about 80° to 90° C. In addition, promotion of the alcohol elimination by drying at a reduced pressure is effective. Although the film is more strongly formed as a drying time is increased, 12 to 24 hours are enough to obtain the necessary resistance to solvents.

One type of alkoxide or aryloxide may be used or two or more types may be mixed. When two or more types are mixed, it is preferable to use types having the same metal components.

Second Embodiment

The second embodiment is characterized in that the alkoxide, the aryloxide, or the chelate compound is used together with the compound containing a hydroxyl or carboxyl group and a solvent-resistive underlying layer is formed by a reaction between these compounds. That is, since the compound containing a hydroxyl or carboxyl group is hydrophilic, it can be dissolved in water or an alcohol solvent which does not attack the resin substrate. An alkoxide, aryloxide, or chelate compound can be also dissolved in water or an alcohol solvent. Therefore, these materials can be applied as aqueous or alcohol solutions on the resin substrate to form a thin film without attacking the substrate. A cured film formed by condensation and crosslinking between both compounds described above has very high resistance to organic solvents for the pigment and hence can serve as a good underlying layer. In addition, an underlying layer of a very thin film having sufficient resistance to the solvents can be formed without any difficult reaction control, thereby improving performance of the optical information memory medium.

An adding amount of an alkoxide, aryloxide, or chelate compound for obtaining the above effect is 5 to 50 wt % and, more preferably, 10 to 30 wt % with respect to the compound containing a hydroxyl or carboxyl group.

When the copolymer or the polymer compound is used as the compound containing a hydroxyl or carboxyl group, a content of a hydroxyl or carboxyl group preferably falls within a predetermined range. That is, when the copolymer is used, a ratio of a monomer component containing a hydroxyl or carboxyl group is 5 to 50 wt % and, preferably, 10 to 40 wt %. When a polymer compound such as a cellulose derivative is used, content of a hydroxyl group or a carboxyl group is 5 to 60 wt %. If the content of a hydroxyl or carboxyl group is less than the above range, crosslinking is incomplete, so that desired characteristics such as sufficient resistance to a solvent for preparing an organic pigment solution cannot be obtained. If the content is more than the above range, the hydrophilic property of the underlying layer becomes too high, so that the organic pigment contained in the recording layer is dissolved or agglomerates due to moisture absorption during storage. As a result, recording sensitivity and recording storage property are degraded.

Similar to the first embodiment, the second embodiment can be modified. That is, when the underlying layer is to be formed, a heat treatment may be performed as needed at a temperature not thermally deforming the substrate. In addition, promotion of the alcohol elimination by drying at a reduced pressure is effective. Furthermore, as an alkoxide or aryloxide, only one type may be used or two or more types may be mixed.

In order to form the underlying layer in the second invention, it is desirable to irradiate the solution coated on the substrate with an ultraviolet light (UV) or electron beam (EB) so as to polymerize and crosslink the above-noted compounds having a hydroxyl group or carboxyl group, i.e., the compounds contained in the solution. Naturally, these compounds should desirably have an unsaturated bond capable of radical polymerization upon irradiation with an UV or EB. The unsaturated bond should desirably by included in the compounds as an acryloyl group or a methacryloyl group. The specific compounds meeting these requirements include, for example:

[I] Monofunctional Compounds such as 2-hydroxyethyl acrylate; 2-hydroxyethyl methacrylate; 2-hydroxypropyl acrylate; 2-hydroxyethyl acryloyl phosphate; methacryloxyethyl phosphate; bis (methacryloxyethyl) phosphate;

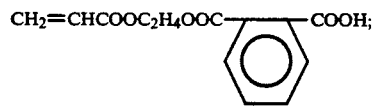

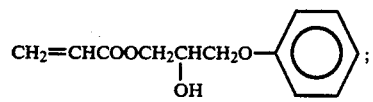

ε-caprolacton-β-hydroxyethyl acrylate; and polycaprolacton acrylate.

[II] Bifunctional Compounds such as polyurethane diacrylate;

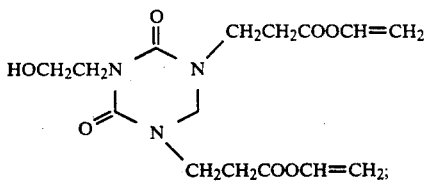

polyethyleneglycol diacrylate; bisphenol A-epichlorhydrin type epoxy diacrylate; alicyclic epoxy diacrylate;

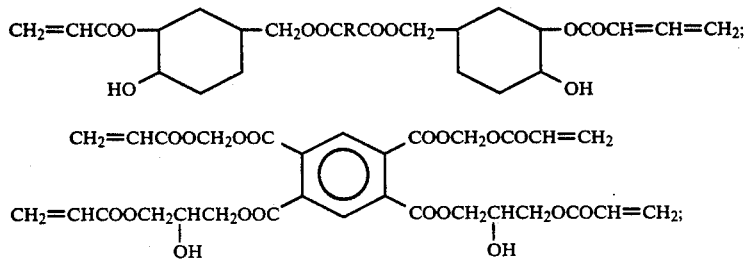

ethyleneglycol diglycidylether dimethacrylate; diethyleneglycol diglycidylether dimethacrylate; polypropyleneglycol diglycidylether dimethacrylate; phthalic acid diglycidylester diacrylate; polybutadiene containing terminal hydroxyl group; polybutadiene-epoxy adduct containing terminal hydroxyl group; and polybutadiene maleic anhydride ester containing terminal hydroxyl group.

[III] Tri- or more Functional Compounds such as pentaerythritol triacrylate; trimethylol propane-propylene oxide adduct triacrylate; dipentaerythritol pentaacrylate; phenol novolac-epichlorhydrin type epoxy polyacrylate; and glycerol polyglycidylether polyacrylate.

These compounds may be used singly or in combination. Also, it is possible to use there compounds in combination with other monomers or oligomers. Further, homopolymers or copolymers of these compounds may be used in the present invention. Still further, it is possible to use hydroxyl group-containing epoxy resin and thiol compounds of cation polymerization type.

The compounds exemplified above permit forming an underlying layer exhibiting a further improved resistance to a solvent. Specifically, these compounds are polymerized and crosslinkages of relatively high density are formed upon irradiation with an ultraviolet light (UV) or electron beam (EB), leading to an excellent solvent resistance of the underlying layer. In the case of using UV-irradiation, a photopolymerization initiator is usually used together. The initiators used in the ordinary photopolymerization can be used in the present invention, including, for example, acetophenone, benzophenone, benzoin methyl ether, benzoin isobutyl ether, benzyldimethylketal, 2-chloro-thiozanthone and azobisisobutyronitrile.

The resin thus polymerized and crosslinked is very hard and loses its thermoplasticity. The UV-cured resin markedly differs from the heat-cured resin in various properties. For example, the UV-cured resin is superior to the heat-cured resin in any of transparency, hardness and solvent resistance. The excellent properties of the UV-cured resin are derived from, mainly, the high crosslinkage density. In order to enhance the crosslinkage density, a photopolymerizable monomer which does not have a hydroxyl group and carboxyl group may be used together. For example, dipentaerythritol pentaacrylate or pentaerythritol triacrylate may be used as such a photopolymerizable monomer. Various researches on the UV-cured resin are reported in, for example, the publications listed below:

(1) S. Saraiya et al., Modern Paint and Coatings, December, pp 37–42 (1974)
(2) C. B. Rybny et al., Journal of Paint Technology, Vol. 46, No. 596, 60–69 (1974)
(3) K. Hashimoto et al., Journal of Radiation Curing, January, pp 4–15 (1981)
(4) Dr. B. E. Hulme, Paint Manufacture, March, pp 9–16 (1975)
(5) Dr. B. E. Hulme, Paint Manufacture, May, pp 12–16 (1975)

In the present invention, the curing by the alkoxide-, aryloxide- or chelete-compound of a metal is utilized in addition to the mechanism of the UV-curing described above. To be more specific, the resin polymerized and crosslinked as described above has a functional group such as a hydroxyl or carbonyl group, with the result that additional crosslinkages are formed by the reaction described previously, which takes place between the above-noted functional group and the alkoxide-, aryloxide- or chelete-compound. Since the hardness of the resin is further promoted by the additional crosslinkages, a sufficient curing can be obtained by only several seconds of UV or EB irradiation even if the film is extremely thin. Desirably, a heat annealing for a short time should be applied after the UV-curing. The heat annealing can be carried out at a temperature lower than that for heat polymerization.

What is important in the underlying layer of the present invention is that an UV- or EB-curing and an additional crosslinkage by the alkoxide-, aryloxide- or chelete-compound are utilized in combination. If UV-curing alone is employed without utilizing the additional crosslinkage, it is difficult to achieve a sufficient curing, leading to problems such as poor solvent resistance, as described previously in conjunction with the prior art. Further, excellent effects as in the present invention cannot be obtained if the additional crosslinkage by the alkoxide-, aryloxide- or chelete-compound is utilized in combination with the heat polymerization, because the underlying layer formed by the heat polymerization is inferior to the underlying layer of the present invention in transparency, hardness and solvent resistance. Particularly, the underlying layer formed by the heat polymerization exhibits a slightly opaque white color, making the heat polymerization unsuitable for use in combination with the additional crosslinkage.

A prominent effect can be obtained, if the monomer- or oligomer-compound described previously is used for forming the underlying layer. Specifically, such a compound has a relatively small molecular weight and has a high hydroxy group content ratio and, thus, is highly soluble in an aqueous solvent. In addition, the resultant solution has a low viscosity. It follows that a very thin film of a uniform thickness can be formed by coating the substrate surface with the solution. As a result, it is possible to prevent the tracking groove formed on the substrate surface from being filled with the underlying layer.

EXAMPLE 1

Titanium tetra n-butoxide Ti(OC$_4$H$_9$)$_4$ was dissolved in ethyl alcohol to obtain a 0.3% solution. This solution was applied on a 1.2-mm thick acryl injection molded disk substrate by a spinner coater. The resultant substrate was heated at 60° C. for 24 hours, thereby forming a 20-nm thick underlying layer consisting of a hydrolyzed condensate of the alkoxide.

Then, cyanine pigment NK-125 (trade name) represented by the following formula and available from Nippon Kanko Shikiso Kenkyusho K. K. was dissolved in methyl ethyl ketone to prepare a 2% solution. This solution was applied on the above substrate by the spinner coater and dried, thereby forming a 80-nm thick recording layer on the underlying layer to obtain an optical information memory medium.

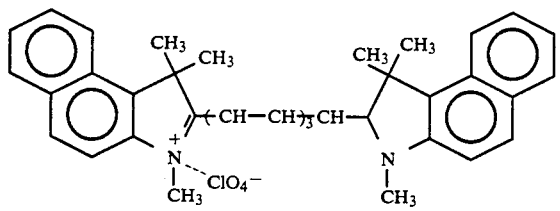

EXAMPLE 2

Silane tetra isopropoxide Si(O-isoC$_3$H$_5$)$_4$ was dissolved in a solvent mixture of ethyl alcohol:isopropyl alcohol=4:1 to obtain a 0.25% solution. Following the same procedures as in Example 1, this solution was applied on a disk substrate and heated following the same procedures as in Example 1, thereby forming a 20-nm thick underlying layer.

Then, a recording layer was formed following the same procedures as in Example 1 to obtain an optical information memory medium.

EXAMPLE 3

Aluminum triisopropoxide Al(O-isoC$_3$H$_5$)$_3$ was dissolved in ethyl alcohol to obtain a 0.3% solution. Following the same procedures as in Example 1, this solution was applied on an acryl injection molded disk substrate and heated, thereby forming a 25-nm thick underlying layer.

Then, following the same procedures as in Example 1, a recording layer was formed to obtain an optical information memory medium.

EXAMPLE 4

Zirconium tetrabutoxide Zr(OC$_4$H$_9$)$_4$ was dissolved in a solvent mixture of ethyl alcohol:n-butyl alcohol=9:5 to obtain a 0.3% solution. Following the same procedures as in Example 1, this solution was applied on a polycarbonate injection molded disk substrate using a spinner coater and dried by a heat treatment, thereby forming a 25-nm thick underlying layer.

Then, following the same procedures as in Example 1, a recording layer was formed to obtain an optical information memory medium.

EXAMPLE 5

Titanium tetra isopropoxide Ti(O-isoC$_3$H$_5$)$_4$, dipentaerythritol hexaacrylate, and a polyurethanacrylate oligomer having a molecular weight of about 1,000 were mixed in a mixing ratio of 40:50:10, and three parts by weight of an ultraviolet polymerization initiator were added thereto. The resultant material was dissolved in ethyl alcohol to obtain a 0.3% solution. This solution was applied on an acryl disk substrate using a spinner coater and dried as in Example 1. The resultant material was polymerized and cured by ultraviolet ray radiation performed under the condition of 400 mJ/cm$^2$. Thereafter, a heat treatment was performed to form a 30-nm thick underlying layer.

Subsequently, following the same procedures as in Example 1, a recording layer was formed to obtain an optical information memory medium.

COMPARATIVE EXAMPLE 1

A recording layer as in Example 1 was formed directly on an acryl disk substrate as in Example 1 without forming an underlying layer, thereby obtaining an optical information memory medium.

COMPARATIVE EXAMPLE 2

A recording layer as in Example 1 was formed directly on a polycarbonate disk substrate as in Example 4 without forming an underlying layer, thereby obtaining an optical information memory medium.

COMPARATIVE EXAMPLE 3

Following the same procedures as in Example 5 except that titanium tetra isopropoxide Ti(O-isoC$_3$H$_5$)$_4$ was not used in formation of an underlying layer, an optical information memory medium was obtained.

PERFORMANCE TEST 1

For each of the optical information memory mediums obtained in Examples 1 to 5 and Comparative Examples 1 to 3, reflectance of the recording layer with respect to light of a wavelength of 830 nm was measured by a spectrophotometer. In addition, a writing laser beam of an output of 7 mW and a wavelength of 830 nm was radiated from the side of the substrate on the recording layer surface of each medium. The beam was focused in a spot size of 1.2 μm and scanned at a linear speed of 9 m/sec, thereby recording a signal of 1 MHz. Then, a reading laser beam of an output of 5 mW was radiated to read out the recorded data, and a CN value (carrier to noise) was measured. The results are shown in Table 1.

TABLE 1

| | | Reflectance (830 nm) | CN Value (RMW30 kHz) | Remarks |
|---|---|---|---|---|
| Example | 1 | 28 (%) | 60 (dB) | |
| | 2 | 28 | 59 | |
| | 3 | 29 | 60 | |
| | 4 | 27 | 59 | |
| | 5 | 28 | 61 | |
| Comparative Example | 1 | 20 | 49 | |
| | 2 | 12 | — | Guide Tracks |

TABLE 1-continued

| | Reflectance (830 nm) | CN Value (RMW30 kHz) | Remarks |
|---|---|---|---|
| | | | Are Attacked To Disable Tracking. CN Valves Cannot Be Measured. |
| | 3 | 25 | 53 |

As is apparent from the above results, any of the optical information memory mediums in Examples 1 to 5 has higher reflectance and recording characteristics than those of the mediums in the comparative examples.

EXAMPLE 6

Polyvinyl butyral (trade name "Eslec BL-3", available from Sekisui Chemical Co., LTD.) obtained by reacting polyvinyl with butyladehyde and containing 32 mol % of a residual hydroxyl group, and titanium tetra n-butoxide were dissolved in a solvent mixture of ethyl alcohol:isopropyl alcohol=100:30 (weight ratio) to obtain a 0.3 wt % solution.

This solution was applied on a 1.2-mm thick acryl injection molded disk substrate by a spinner coater and heated at 60° C. for 24 hours, thereby forming a 20-nm thick underlying layer.

Then, cyanine pigment NK-2014 (trade name) represented by the following formula and available from Nippon Kanko Shikiso Kenkyusho K. K. was dissolved in methyl ethyl ketone to prepare a 2% solution. This solution was applied on the above substrate by a spinner coater and dried, thereby forming a 65-nm thick recording layer on the underlying layer and obtaining an optical information memory medium.

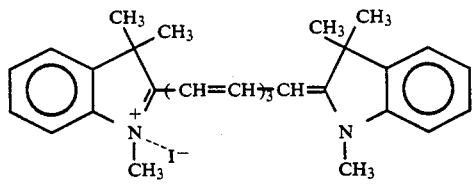

EXAMPLE 7

An ethylene-vinylacetate copolymer containing 31 mol % of ethylene was hydrolyzed to obtain a resin containing 45 mol % of vinyl alcohol units. 100 parts by weight of the obtained resin and 45 parts by weight of zirconium tetra isopropoxide were dissolved in a solvent mixture of ethyl alcohol:isopropyl alcohol=4:1 (weight ratio) to obtain a 0.35 wt % solution.

Following the same procedures as in Example 6, this solution was applied on a disk substrate and heated under the same condition as in Example 6, thereby forming a 20-nm thick underlying layer.

Then, following the same procedures as in Example 6, a recording layer was formed to obtain an optical information memory medium.

EXAMPLE 8

100 parts by weight of an ethyl cellulose having a degree of substitution of 2.5 and 25 parts by weight of di-iso-propoxy (ethyl acetoacetato) aluminum were dissolved in a solvent mixture of ethyl alcohol:isopropyl alcohol=4:1 (weight ratio) to obtain a 0.3 wt % solution.

This solution was applied on a substrate as in Example 6 and heated under the same conditions as in Example 6, thereby forming a 20-nm thick underlying layer. An optical recording layer as in Example 1 was formed on the underlying layer, thereby obtaining an optical information memory medium.

EXAMPLE 9

Acryl acid and ethyl methacrylate were copolymerized at a molar ratio of 50:50 to obtain a copolymer having a molecular weight of about 3,000. 100 parts by weight of the copolymer and 15 parts by weight of tris(acethylacetonato) aluminium were dissolved in a solvent mixture of ethyl alcohol:isopropyl alcohol=4:1 (weight ratio), thereby obtaining a 0.3 wt % solution.

This solution was applied on a polycarbonate injection molded disk substrate and heated under the same conditions as in Example 6, thereby forming a 20-nm thick underlying layer.

20 wt % of an acryl resin having an average molecular weight of 3,000 were added as a binder to the cyanine pigment used in Example 6, and the resultant material was dissolved in methyl ethyl ketone to prepare a 3 wt % solution. This solution was applied following the same procedures as in Example 1 to form a 70-nm thick recording layer on the underlying layer, thereby obtaining an optical information memory medium.

EXAMPLE 10

| | |
|---|---|
| Water-soluble epoxy acrylate (trade name "K-6113") Mitsubishi Rayon Co., Ltd. | 70 parts by weight |
| Dipentaerythritol pentaacrylate (trade name "Allonix M-400") TOAGOSEI CHEMICAL INDUSTRY CO., LTD | 10 parts by weight |
| Pentaerythritol triacrylate (trade name "Allonix M-305") TOAGOSEI CHEMICAL INDUSTRY CO., LTD | 20 parts by weight |
| Ultraviolet ray polymerization initiator | 5 parts by weight |
| Titanium tetra normal butoxide | 60 parts by weight |

The above components are dissolved in a solvent mixture of methyl alcohol:ethyl alcohol:n-butyl alcohol=5:4:1, thereby preparing a 0.32 wt % solution. This solution was applied on the surface of a 12-mm thick acryl injection molded disk substrate by a spinner coater. Then, high-pressure mercury was used to radiate and polymerize the resultant material at 400 mJ/cm², thereby forming a 20-nm thick underlying layer.

A mixture of the cyanine pigments used in Examples 1 and 6 were dissolved in methyl ethyl ketone to prepare a 2% solution. This solution was applied by a spinner coater and dried to form a 65-nm thick recording layer on the underlying layer, thereby obtaining an optical information memory medium.

EXAMPLE 11

| | |
|---|---|
| Ethylene glycol diglycidyl ether dimethacrylate (trade name "Denacol DM-811") Nagase Kasei K.K. | 60 parts by weight |
| Dipentaerythritol hexaacrylate | 40 parts by weight |

| -continued | |
|---|---|
| Ultraviolet ray polymerization initiator | 7 parts by weight |
| Titanium tetra normal butoxide | 100 parts by weight |

The above components were dissolved in a solvent mixture of ethyl alcohol:isopropyl alcohol=6:4, thereby preparing a 0.40 wt % solution. Following the same procedures as in Example 10, this solution was used to form an underlying layer. Then, a recording layer was formed following the same procedures as in Example 10, thereby obtaining an optical information memory medium.

COMPARATIVE EXAMPLE 4

A recording layer as same as in Example 6 was formed directly on an acryl disk substrate of Example 6 without forming an underlying layer, thereby obtaining an optical information memory medium.

COMPARATIVE EXAMPLE 5

A recording layer as same as in Example 4 was formed directly on a polycarbonate disk substrate of Example 9 without forming an underlying layer, thereby obtaining an optical information memory medium.

COMPARATIVE EXAMPLE 6

50 parts by weight of dipentaerythrilol hexaacrylate and 10 parts by weight of a polyurethane acrylate oligomer having a molecular weight of 1,000 were mixed with each other. Three parts by weight of an ultraviolet ray polymerization initiator were added to 100 parts by weight of the above mixture, and the resultant material was dissolved in ethyl alcohol to obtain a 0.3 wt % solution.

This solution was applied on an acryl substrate as in Example 1 by a spinner coater and dried. The resultant material was cured by ultraviolet ray radiation under the condition of 400 mJ/cm², thereby forming a 30-nm thick underlying layer.

Then, following the same procedures as in Example 6, a recording layer was formed to obtain an optical information memory medium.

PERFORMANCE TEST 2

For each of the optical information memory mediums in Examples 6 to 11 and Comparative Examples 4 to 6, reflectance of the recording layer with respect to a laser beam of a wavelength of 830 nm was measured by a spectrophotometer. At this time, the laser beam was radiated from the side of the substrate. In addition, a writing laser beam of an output of 7 mW and a wavelength of 830 nm was radiated from the substrate side on the recording layer surface of each medium. The radiated beam was focused in a spot size of 1.2 μm and scanned at a linear speed of 9 m/sec, thereby recording a signal of 1 MHz. Then, a reading laser beam of an output of 0.5 mW was radiated to read out the recorded signal, and a CN value (carrier to noise) was measured.

Then, these mediums were left to stand under the conditions of a temperature of 60° C. and a relative humidity of 90% for 1,000 hours, and the reflectance and the CN ratio were measured in the same manner.

The results are shown in Table 2 below.

TABLE 2

| | | Reflectance | | C/N (RBW-30 KHz) | |
|---|---|---|---|---|---|
| | | Initial State | After Humidity Test | Initial State | After Humidity Test |
| Example | 6 | 31% | 30% | 59 dB | 59 dB |
| | 7 | 30 | 29 | 58 | 57 |
| | 8 | 31 | 31 | 59 | 58 |
| | 9 | 29 | 29 | 57 | 60 |
| | 10 | 34 | 33 | 61 | 60 |
| | 11 | 35 | 33 | 61 | 59 |
| Comparative Example | 4 | 18 | 13 | 48 | 40 |
| | 5 | 11 | 9 | Not Measurable | — |
| | 6 | 29 | 24 | 54 | 51 |

As is apparent from the above results, any medium of Examples 1 to 11 was higher reflectance, recording characteristics, and durability than those of the comparative examples.

EXAMPLE 12

| | |
|---|---|
| Glycerol polyglycidylether polyacrylate (trade name "Denacol DA-314") Nagase Kasei K.K. | 80 parts by weight |
| Dipentaerythritol hexaacrylate (DPHA) | 20 part by weight |
| Polymerization Initiator | 5 parts by weight |
| Titanium tetra normal butoxide | 30 parts by weight |

The above components were dissolved in a solvent mixture of ethyl alcohol:isopropyl alcohol=1:1 by weight to prepare a 0.5 wt % solution. A disk substrate prepared by injection molding of an acrylic resin, said substrate having a thickness of 1.2 nm, was coated with the solution by using a spin coater. Then, the coating was irradiated with light of 400 mJ/cm² using a high pressure mercury lamp, followed by heating at 60° C. for 12 hours so as to form an underlying layer 20 nm thick. Further, the underlying layer was coated by using a spin coater with a 2% methyl ethyl ketone solution of NK-2014 (trade name of cyanine pigment represented by the following formula and manufactured by Nippon Kanko Shikiso Kenkyusho K. K.):

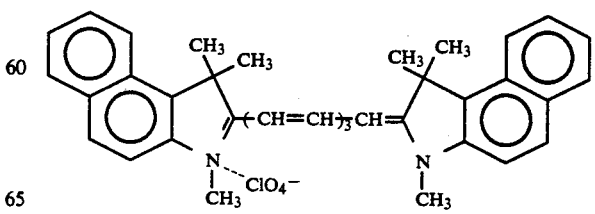

The pigment coating was dried to form an optical recording layer 65 nm thick on the underlying layer, thereby obtaining a desired optical information memory medium.

EXAMPLE 13

| Phthalic acid monoacryloyloxy ethylester | 60 parts by weight |
| Dipentaerythritol ε-caprolactone adduct hexaacrylate | 40 parts by weight |
| Polymerization initiator | 5 parts by weight |
| Zirconium tetraisopropoxide | 70 parts by weight |

The above components were dissolved in a solvent mixture of ethyl alcohol:isopropyl alcohol=4:1 by weight to prepare a 0.35 wt % solution. A disk substrate similar to that in Example 12 was coated with the solution as in Example 12 to form an underlying layer, followed by forming an optical recording layer on the underlying layer as in Example 12 so as to obtain an optical information memory medium.

EXAMPLE 14

| Bisphenol A-epichlorhydrin epoxy resin having acryl-modified terminal structure | 60 parts by weight |
| DPHA | 50 parts by weight |
| Ethylene glycol dimethacrylate | 5 parts by weight |
| Polymerization initiator | 3 parts by weight |
| Diisopropoxy (ethyl acetoacetato) aluminum | 25 parts by weight |

The above components were dissolved in a solvent mixture of methyl alcohol:ethyl alcohol:isopropyl alcohol=4:2:2 by weight to prepare a 0.4 wt % solution. A substrate as in Example 12 was coated with the solution. The coating was cured by crosslinking as in Example 12, followed by heating at 60° C. for 10 hours so as to form an underlying layer 20 nm thick.

Then, pigment noted in Example 12 was dissolved in methyl ethyl ketone, with 20 wt % of acrylic resin having an average molecular weight of 30,000 added as a binder, to prepare a 3 wt % of solution. The underlying layer was coated with the solution as in Example 12 for form a recording layer 70 nm thick on the underlying layer so as to obtain a desired optical information memory medium.

EXAMPLE 15

| 2-mercaptoethanol-modified 1,2-polybutadiene | 50 parts by weight |
| DPHA | 50 parts by weight |
| Polymerization initiator | 5 parts by weight |
| Acetylacetatoaluminum | 40 parts by weight |

The above components were dissolved in a solvent mixture of ethyl alcohol:isopropyl alcohol=4:1 by weight to prepare a 0.5 wt % solution. A polycarbonate disk substrate similar to that in Example 12 was coated with the solution as in Example 12 to form an underlying layer, followed by forming an optical recording layer on the underlying layer as in Example 12 so as to obtain an optical information memory medium.

COMPARATIVE EXAMPLE 7

An optical information memory medium was prepared by directly coating an acrylic substrate as in Example 12 with an optical recording layer as in Example 12.

COMPARATIVE EXAMPLE 8

An optical information memory medium was prepared by directly coating a polycarbonate disk substrate as in Example 15 with an optical recording layer as in Example 15.

COMPARATIVE EXAMPLE 9

Dipentaerythritol hexaacrylate and polyurethane acrylate oligomer having a molecular weight of about 1000 were mixed with each other at a mixing ratio of 50:10. Added to the mixture was 3 parts of an UV-polymerization initiator, and the resultant mass was dissolved in ethyl alcohol to prepare a 3% solution. An acrylic substrate as in Example 12 was coated with the solution by using a spin coater. After drying, the coating was irradiated with an ultraviolet light at 400 mJ/cm$^2$ for the curing so as to form an underlying layer 30 nm thick. Further, an optical recording layer was formed on the underlying layer so as to obtain an optical information memory medium.

PERFORMANCE TEST 3

Reflectance of the recording layer and CN value of the reproduced information were measured for each of the optical information memory mediums in Examples 12-15 and Comparative Examples 7-9. Then, these mediums were left to stand for 1000 hours at a temperature of 60° C. and a relative humidity of 90%, and the reflectance and CN ratio were measured again. Table 3 shows the results.

TABLE 3

| | | Reflectance | | C/N (RBW = 30 KHz) | |
| --- | --- | --- | --- | --- | --- |
| | | Initial State | After Humidity Test | Initial State | After Humidity Test |
| Example | 12 | 32% | 30% | 63 dB | 62 dB |
| | 13 | 30% | 29% | 62 dB | 61 dB |
| | 14 | 31% | 29% | 60 dB | 59 dB |
| | 15 | 30% | 29% | 60 dB | 58 dB |
| Comparative Example | 7 | 18% | 13% | 48 dB | 40 dB |
| Comparative Example | 8 | 11% | 9% | Impossible to measure | — |
| Comparative Example | 9 | 29% | 24% | 54 dB | 51 dB |

The methods of measurement employed in this test were equal to those employed in Performance Tests 1 and 2.

As apparent from Table 3, the optical information memory mediums according to examples of the present invention were found to be excellent in reflectance and recording characteristics. In addition, the memory mediums exhibited a high durability.

EXAMPLE 16

Comparison was made between the disk of the present invention and the disk of prior art employing heat-curing instead of UV-curing in the present invention.

<Preparation of Disk of Present Invention>

| | |
|---|---|
| Oligoester acrylate having a following structure: (trade name "Alonix M-5700") Toa Gosei K.K. $CH_2=CHCOOCH_2-CHCH_2O-\text{(phenyl)}$ with OH | 30 parts by weight |
| DPHA | 20 parts by weight |
| Photoinitiator | |
| Benzyldimethyl ketal | 6 parts by weight |
| Benzoin isobutyl ether | 2 parts by weight |
| 2-chlorothioxanton | 2 parts by weight |
| Titanium tetra normal butoxide | 50 parts by weight |

The above components were dissolved in a solvent mixture of methanol:ethanol:n-butanol=50:50:10 by weight to prepare a 0.35 wt % solution. The surface of an acryl injected molded disk substrate 12 nm thick was coated with the solution, followed by UV-polymerization as in Example 12 so as to form an underlying layer 20 nm thick. The UV-irradiation time was 5 seconds. After the UV-polymerization, heat annealing was performed at 50° C. for 2 hours. Finally, a recording layer was formed as in Example 12.

<Preparation of Disk of Prior Art>

| | |
|---|---|
| Methyl methacrylate/hydroxybutyl acrylate (trade name "Water-sol S744") Dainippon Ink K.K. | 100 parts by weight |
| Initiator (benzoyl peroxide) | 5 parts by weight |
| Titanium tetra normal butoxide | 100 parts by weight |

The above components were dissolved in a solvent mixture of methanol:ethanol:n-butanol=50:50:10 by weight to prepare a 0.35 wt % solution. The surface of an acryl injected molded disk substrate 12 nm thick was coated with the solution, followed by thermal polymerization at 70° C. for 2 hours so as to form an underlying layer 20 nm thick. Finally, a recording layer was formed as in Example 12.

PERFORMANCE TEST

The disks of the present invention and prior art were tested for the surface state, spectral reflectance, digital voltage reflectance, C/N ratio and noise level. Table 4 shows the results. The surface state was measured by using an optical microscope. The measuring method of the other items were equal to those employed in Performance Tests 1 and 2. Table 4 also shows the data for control case, which was equal to the disk of the present invention except that an underlying layer was not formed in the control case.

TABLE 4

| | Control Case | Disk of present invention | Disk of prior art |
|---|---|---|---|
| Surface state | No difference in microscopic observation | | |
| Spectral reflectance (%) | 6 | 30 | 9 |
| Digital voltage reflectance (mv) | 29.7 | −116.6 | −35.1 |
| C/N ratio (dPm) | 40 | 65.5 | 40 |
| Noise level (dEm) | −67.2 | −75.7 | −70.0 |

As has been described above, according to the present invention, since an underlying layer if formed on a substrate, it can be formed much thinner than a conventional underlying layer and can have improved resistance to solvents, thereby providing an optical information memory medium having higher writing/reading characteristics and durability.

We claim:

1. An optical information memory medium comprising:

a substrate;

an underlying layer formed on said substrate comprising an UV-cured or EB cured resin prepared from a solution comprising (i) a monomer- or oligomer-compound which is polymerizable with ultraviolet irradiation or electron beam irradiation and which has a hydroxyl group or a carboxyl group and (ii) an alkoxide-, aryloxide- or chelate- compound of a metal selected from the group consisting of Al, Ti, Zr, In, Zn, Mg, Ni, and Cu, said solution having been applied on the substrate and irradiated with ultraviolet rays or electron beams, thereby causing the monomer- or oligomer- compound to be polymerized and crosslinked and further to be condensed with said alkoxide-, aryloxide- or chelate-compound; and a recording layer formed on said underlying layer, which consists essentially of an organic pigment.

2. An optical information memory medium according to claim 1, wherein said monomer- or oligomer-compound has an acryloyl group as a functional group which enables UV- or EB-polymerization.

3. An optical information memory medium according to claim 1, wherein said monomer- or oligomer-compound has an methacryloyl group as a functional group which enables UV- or EB-polymerization.

4. An optical information memory medium according to claim 1, wherein said underlying layer comprises an UV-cured resin prepared from said solution by irradiating ultraviolet ray, and said solution further containing (iii) a photopolymerization initiator.

5. An optical information memory medium according to claim 1, wherein said solution further comprises (iii) an acrylate- or methacrylate-compound having no hydroxyl group or carboxyl group.

6. An optical information memory medium according to claim 1, wherein said alkoxide-compound of a metal is a titanium tetrapropoxide or a titanium tetrabutoxide.

7. An optical information memory medium according to claim 1, wherein said chelate-compound of a metal is a di-iso-propoxy(ethyl acetoacetato)aluminium or acetylasetonato aluminum.

8. An optical information memory medium according to claim 1, wherein said substrate is made of a synthetic resin.

9. An optical information memory medium according to claim 1, wherein said substrate has a guide track which comprises a groove on the surface there.

10. An optical information memory medium according to claim 4, wherein said solution further comprises (iv) an acrylate- or methacrylate-compound having no hydroxyl group or carboxyl group.

11. An optical information memory medium according to claim 10, wherein said monomer- or oligomer-compound has an acryloyl group as a functional group which enables UV-polymerization.

12. An optical information memory medium according to claim 10 wherein said monomer-, oligomer- or polymer-compound has a methacryloyl group as a functional group which enables UV-polymerization.

13. An optical information memory medium according to claim 11 wherein said alkoxide-compound of a metal is a titanium tetrapropoxide or a titanium tetrabutoxide.

14. An optical information memory medium according to claim 12 wherein said alkoxide-compound of a metal is a titanium tetrapropoxide or a titanium tetrabutoxide.

15. An optical information memory medium according to claim 11 wherein said chelate-compound of a metal is a di-iso-propoxy(ethyl acetoacetato)aluminium of acetylasetonato aluminum.

16. An optical information memory medium according to claim 12 wherein said chelate-compound of a metal is a di-iso-propoxy(ethyl acetoacetato)aluminium or acetylasetonato aluminium.

* * * * *